T. M. AVERY.
COUPLING LINK.
APPLICATION FILED FEB. 12, 1917.
1,246,520. Patented Nov. 13, 1917.
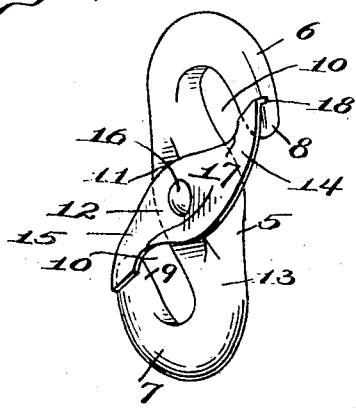
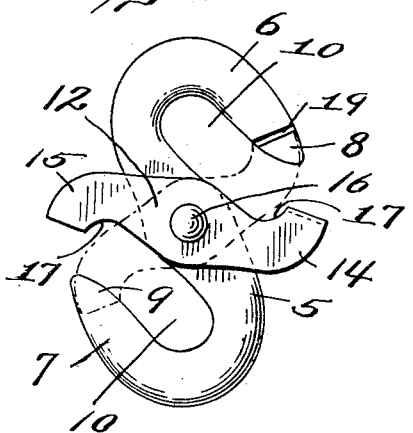 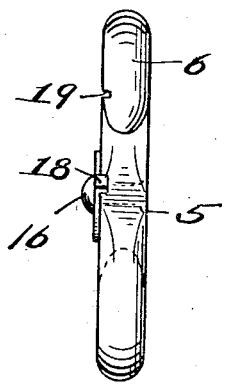 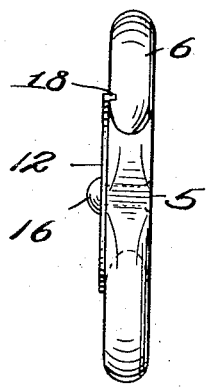
Inventor
True M. Avery

UNITED STATES PATENT OFFICE.

TRUE M. AVERY, OF GLENS FALLS, NEW YORK, ASSIGNOR TO ARROW-GRIP MANUFACTURING COMPANY, OF GLENS FALLS, NEW YORK, A CORPORATION OF NEW YORK.

COUPLING-LINK.

1,246,520.  Specification of Letters Patent.  Patented Nov. 13, 1917.

Application filed February 12, 1917. Serial No. 148,120.

*To all whom it may concern:*

Be it known that I, TRUE M. AVERY, a citizen of the United States, residing at Glens Falls, in the county of Warren and State of New York, have invented new and useful Improvements in Coupling-Links, of which the following is a specification.

This invention relates to a coupling or connecting link and more particularly to what is known as an S-hook; and the primary object of the same is to provide a link or hook having two opposite or alined hook extremities with simple and easily operated throat closing means to prevent accidental disengagement of chains or other devices that may be in engagement with the hooks. A further object of the invention is to provide an S-hook with throat closing means proportioned and shaped in such manner as to avoid the material projection thereof at any point and provide a compact structure of a strong and durable character that is not liable to become broken or accidentally shift from a locking position.

With these and other objects and advantages in view the invention consists in the construction and arrangement of the several parts of the coupling link or hook which will be more fully hereinafter described and claimed.

In the drawing:

Figure 1 is a perspective view of a coupling link or hook embodying the features of the invention.

Fig. 2 is a top plan view of the same showing the throat closure open in full lines and closed in dotted lines.

Fig. 3 is an edge elevation of the coupling link or hook with the throat closure open.

Fig. 4 is a view similar to Fig. 3 with the throat closure engaging the terminals of the hooks and locked against accidental displacement.

The numeral 5 designates the body of the improved coupling link or hook, and 6 and 7 the terminal hooks all shaped in the form of the letter S, the ends 8 and 9 of the respective hooks 6 and 7 being tapered and so positioned in relation to the adjacent portion of the body 5 as to provide throats 10 of similar contour and extent in relation to each hook. The intermediate portion 11 of the body is slightly increased in dimensions and flattened to operatively receive thereon a throat closure 12, consisting of a resilient metal plate of suitable thickness with an intermediate enlargement 13 from which arms 14 and 15 regularly project in reverse curved directions to engage the ends 8 and 9 of the respective hooks 6 and 7. The intermediate widened body portion 13 of the throat closure is centrally engaged by a pivot stud or rivet 16 which is secured in the intermediate enlarged portion 11 of the body 5 of the hook, as shown by dotted lines in Figs. 3 and 4. On this pivot stud or rivet the throat closure 12 is free to swing or have pivotal movement, but the said stud holds the throat closure in tight frictional engagement with respect to the body of the hook so that the free terminals of the arms 14 and 15 will closely engage and bear upon the ends 8 and 9 of the hooks, as clearly shown by Figs. 1 and 2. The throat closure 12 is so proportioned and shaped that the projection of any part thereof beyond the maximum projection of the hooks 6 and 7 is reduced to a minimum, and in fact it is intended that the extreme outer edge portions of the arms 14 and 15 of the throat closure coincide with the outer edge portions of the ends 8 and 9 of the hooks 6 and 7 when the said closure is in normal engaging position with relation to the said hook ends so as to avoid any catching projections or shoulders that might operate to accidentally disengage the throat closure from its desired position relatively to the hook ends. The throat closure 12 does not interfere with the throats 10 of the hooks 6 and 7, the latter having sufficient length to permit ample play of chain links or other analogous devices engaged by the hooks 6 and 7, and the inner edge portions 17 of the arms 14 and 15 are curved to give a better throat or link opening contour and a longer play or movement to the links or other devices engaged by the hooks 6 and 7. The improved throat closure is provided with a very simple form of lock at the terminal of one of the arms, in the present instance the arm 14, which is bent at right angles to form a locking lip or catch 18, and the corresponding end 8 of the hook 6 is formed with a cross-groove or seat 19 into which the lip or catch 18 is adapted to snap and thereby hold the throat closure 12 against loose movement and prevent disengagement thereof from a closing position relatively to the throats 10 of the two hooks. It will be readily understood that the lip or catch 18 may be formed on either end of the throat closure 12 and the groove or cross-seat 19 correspondingly changed or located in either hook end.

The operation of the improved coupling link or S-hook is very simple, and in order to clear the throats 10 the lip or catch 18 is disengaged from the groove or seat 19 by slightly pulling outwardly on the arm 14 of the closure 12 and then turning the closure on the pivot or rivet 16. After the hooks 6 and 7 have been engaged with links or other devices the closure 12 is pushed inwardly from the position shown in Fig. 2 and the lip or catch 18 rides over the surface of the end 8 of the hook 6 until it reaches the groove or seat 19, when it snaps into place owing to the resiliency of the closure and thereby locks the latter against movement and closes the throats 10.

The improved coupling link or S-hook can be easily manufactured and it is also obvious that the proportions and dimensions thereof may be varied at will. The main advantage of the improved throat closure is that it is constructed of a flat piece of metal and that the lip or catch 18 is brought into engagement fully with the groove or seat 19 and in view of the intermediate widened portion 11 of the body of the closure considerable spring resistance is brought to bear in relation to the locking end of the said closure. Moreover, it will be seen that the locking means for the closure is shielded from contact with a link or other device that may be in engagement with the adjacent hook, and the said lip or catch 18 and the groove or seat 19 are at such an angle that accidental disengagement of the lip or catch is prevented, yet the said lip or catch may be readily disengaged from its groove by a simple outward pull on the arm of the closure carrying the said lip or catch. These structural advantages all contribute to the production of a very effective coupling link or S-hook.

What is claimed as new is:

1. A connecting link consisting of a rigid body of S-shape to provide oppositely and reversely disposed hooks with outwardly opening throats in diagonal planes at opposite sides of the center of the body, and a flat spring plate centrally pivoted and held against one side of the body and terminating in reversely curved arms to spring over the ends of the hook members.

2. A connecting link consisting of a rigid body of S-shape to provide oppositely and reversely disposed hooks with outwardly opening throats in diagonal planes at opposite sides of the center of the body, and a flat spring plate pivoted at its center on one side of the center of the body and terminating in reversely curved arms to spring over the ends of the hooks and close the throats, one of the plate arms and one of the hook ends having coöperating locking means to hold the plate against accidental movement.

3. A connecting link consisting of a rigid body of S-shape to provide oppositely and reversely disposed hooks with outwardly opening throats in diagonal planes at opposite sides of the center of the body, the one hook having a groove extending straight across the same in a transverse direction near the end thereof, and a flat spring closure plate pivoted at its center on one side of the center of the body and provided with reversely curved terminal arms to close the throats, the one arm being provided with an annularly bent terminal catch to engage the groove of the one hook end.

In testimony whereof I have hereunto set my hand.

TRUE M. AVERY.

Copies of this patent may be obtained for five cents each, by addressing the "Commissioner of Patents, Washington, D. C."